United States Patent [19]

Baum

[11] 4,192,965
[45] Mar. 11, 1980

[54] FLAT RIBBON CABLE RETAINER

[75] Inventor: Henry K. Baum, Franklin Park, Ill.

[73] Assignee: GTE Automatic Electric Laboratories Incorporated, Northlake, Ill.

[21] Appl. No.: 865,760

[22] Filed: Dec. 29, 1977

[51] Int. Cl.² .............................................. H02G 3/00
[52] U.S. Cl. ...................................... 174/135; 174/92; 248/68 R; 248/74 R
[58] Field of Search ...................... 174/135, 92, 117 A

[56] References Cited
U.S. PATENT DOCUMENTS

| | | | |
|---|---|---|---|
| 3,484,541 | 12/1969 | Campbell | 174/92 X |
| 3,757,031 | 9/1973 | Izraeli | 174/92 X |
| 4,045,750 | 8/1977 | Marshall | 174/117 A X |

Primary Examiner—B. A. Reynolds
Assistant Examiner—E. F. Borchelt
Attorney, Agent, or Firm—Robert J. Black

[57] ABSTRACT

A retainer for accommodating and routing flat ribbon cable comprising two flat panels hinged at one end and arranged to latch together, wherein flat ribbon cable can be angularly routed in any desired direction and retained in position between the latched panels.

10 Claims, 3 Drawing Figures

FLAT RIBBON CABLE RETAINER

BACKGROUND OF THE INVENTION

1. Field of the Invention

This invention relates to flat ribbon cable, and more particularly to a device for retaining and angularly routing at least one flat ribbon cable.

2. Description of the Prior Art

Presently flat ribbon cable is finding increased usage in the electronics field for electrically connecting electronic subassemblies within an electronic device or system. The flat ribbon provides for a neat, orderly and flexible means of conductor management where a high volume of electrical interconnection is required.

Typically, flat ribbon cable is composed of a plurality of parallel conductors disposed in a parallel relation in a common plane and encapsulated in a covering of insulating material, such as polyester or other plastic, which is suitably bonded to and about the several conductors of the cable. The cables typically have an overall thickness of 0.015 to 0.044 inch providing for good flexuous qualities without danger of damaging either the insulation or conductors. The conductors are of either flat foil, solid or stranded wire.

In certain applications such as computer devices where a great density of electrical wiring is required between subassemblies such as between a main frame and peripherals, the use of flat ribbon cable provides for quick and orderly interconnection of electrical conductors between the subassemblies. In this type of high density application proper cable management is required so as to organize, simplify and consequently use as little space as possible when routing flat cables to their various interconnection points.

Currently, several methods of retaining flat cable are employed. One method is to use small clips which are installed at numerous points to retain the cable to a supporting surface. When a change in direction is required, such as 90° to the cable's direction, the cable is folded upon itself and held in this position by two or more of these clips. Consequently, large numbers of these devices are needed to properly retain and route the cable in a neatly and tightly folded manner which ultimately requires substantial labor to manufacture and install. Another method is to simply tie down the cable by any convenient means, such as tape, wire or string. This method does not retain the folded cable effectively and cannot conveniently retain the cable to a supporting surface and is effective only when building two or more cables together. Substantial labor is also required in installing this method.

Accordingly, it is the object of the present invention to provide a device for a simple, effective, one-piece arrangement for angularly routing and tightly retaining flat ribbon cable.

SUMMARY OF THE INVENTION

The present invention, consists of a first panel generally square in plan having its edges truncated and a second panel substantially identical to the first. Both panels are joined at one of their truncated corners by a U-shaped hinge. The remaining truncated corners include L-shaped latches arranged to interlockingly engage each other when the second panel is folded over the first panel. A central portion of each panel extends inward and is generally convex in cross section. Sidewalls are arranged about the perimeter of each panel. Each sidewall further includes a recessed portion adapted to accept within the recess a flat ribbon cable.

The flat ribbon cable retainer of the present invention is typically installed in the following manner: a flat ribbon cable is entered transversely on the recessed portion of one of the first panel sidewalls folded on itself and exits transversely within a recess of a corresponding first panel sidewall at an orthogonal direction. The second panel is then rotated about the hinge to fold over the first panel and folded cable, to interlockingly engage corresponding second panel latches to first panel latches locking the panels together and retaining the folded cable in position. The convex portions apply a clamping force on the cable maintaining it in a tightly folded condition. Similarly, two flat ribbon cables may be used in the manner previously described with the two cables entering at opposite ends of the retainer, folded over each other and exiting at opposite ends, or entering and exiting 90° to each other.

Where certain routings require that the cable break out at right angles to the plane in which the retainer is lying a right angle breakout plate is provided. The breakout plate comprises a generally triangular member with L-shaped arms formed at opposite ends and is arranged to snap into the recessed portion of any retainer sidewall.

To facilitate the mounting of the retainer to a supporting surface either one or both of the outer surfaces of the first and second panels may be clad with adhesive material.

BRIEF DESCRIPTION OF THE DRAWINGS

A better understanding of the invention may be had from a consideration of the following detailed description taken in conjunction with the accompanying drawings in which.

DESCRIPTION OF THE PREFERRED EMBODIMENT

Figure 1:
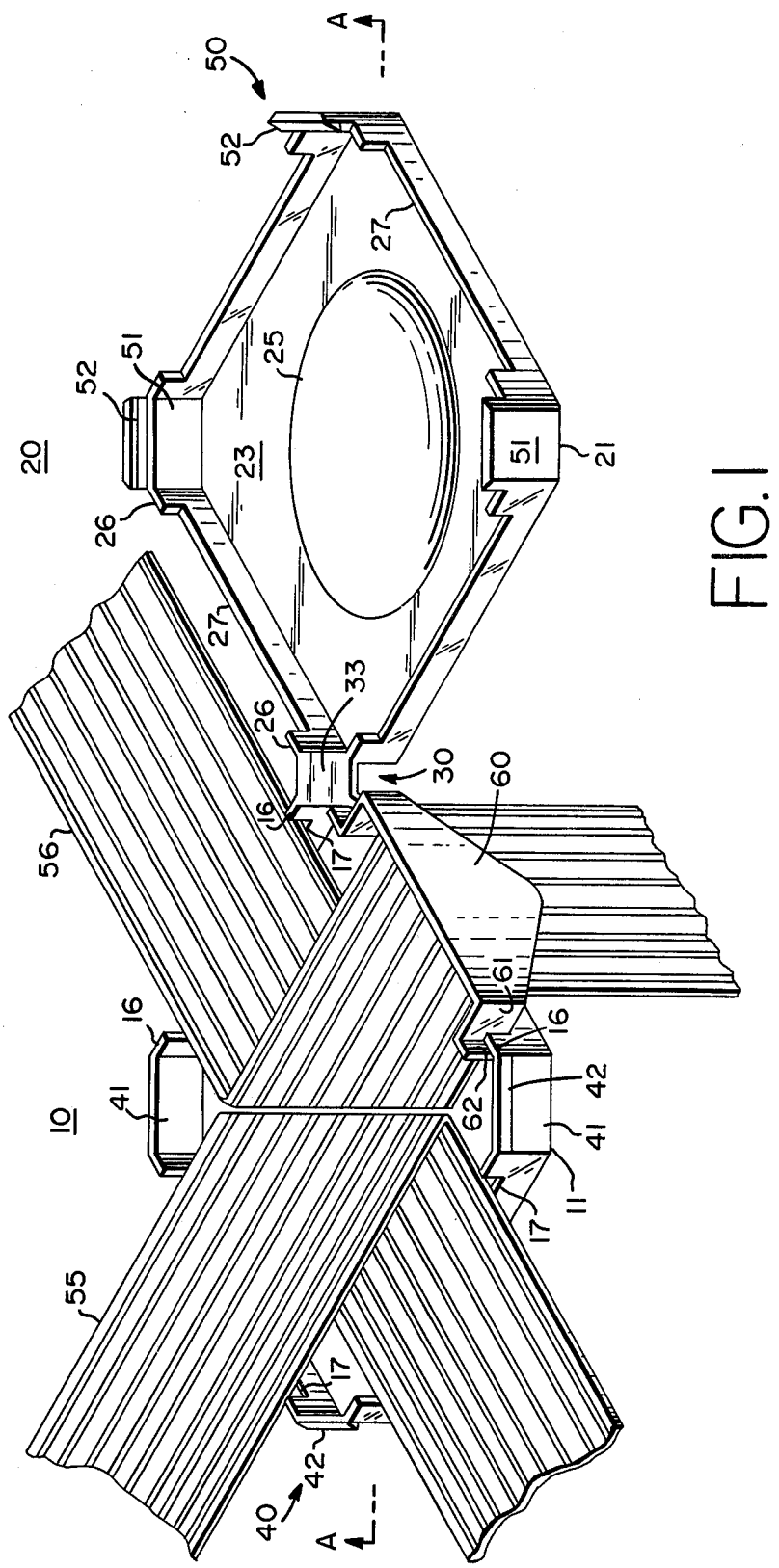
FIG. 1 is a perspective view of a typical flat ribbon cable retainer in accordance with the present invention, in opened position, with flat ribbon cables positioned therein.

Referring now to the accompanying drawings, FIG. 1 illustrates a flat ribbon cable retainer in accordance with the principles of the present invention. The assembly comprises a one-piece unitary structure of molded resilient plastic. The basic structure consists of two portions, a first panel 10, generally square in plan having all of its corners truncated identical to the edge shown as 11, and a second panel 20 generally square in plan and having truncated corners identical to the edge shown as 21. A hinge 30, molded into the structure joins the first panel 10 at one of its edges 11 to the second panel 20 at a respective edge 21. The remaining edges 11 of the first panel 10 includes latching devices integrally molded into the structure identical to that shown as 40. The second panel 20 also includes latching devices integrally molded into the structure identical to that shown as 50.

Figure 2:
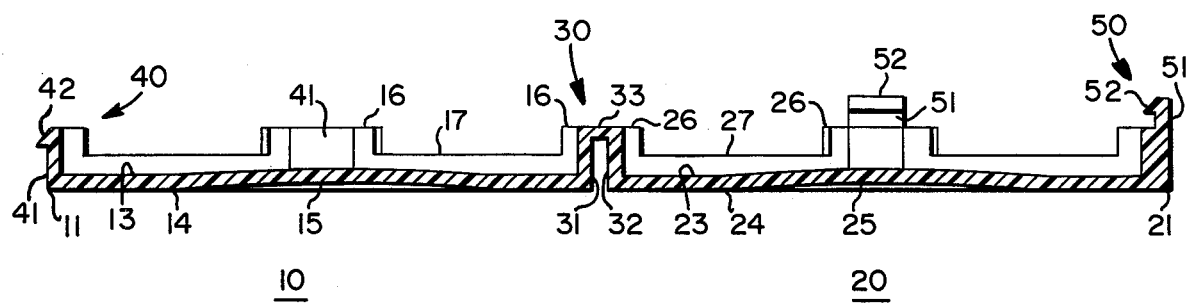
FIG. 2 is a sectional elevational view seen at line A—A in FIG. 1.

Referring now to FIG. 2, the first panel 10 includes inner and outer surfaces 13 and 14 respectively, identical to second panel 20 inner and outer surfaces 23 and 24. Central portions 15 and 25 of inner surfaces 13 and 23 are arranged inwardly and are generally convex in cross section.

The hinge 30 comprises a U-shaped member having first and second legs 31 and 32 respectively, and a flexuous portion 33 perpendicular to the first and second legs integrally joining the legs at one end. The opposite end of the first leg 31 extends vertically and perpendicular to the inner surface 13 of the first panel 10 to a predetermined height. The opposite end of the second leg 32 extends identically as the first leg 31 from the second panel 20.

The latching devices 40, 50 are comprised of L-shaped members having first and second legs 41, 42 and 51, 52 respectively. On the first panel 10 one end of the first leg 41 extends vertically and perpendicular to the inner surface 13 from an edge 11 to a height equal with that of the hinge 30. The second leg 42 extends outwardly from the first panel 10 from an opposite end of the first leg 41 and perpendicular to the first leg. A similar latching device 40 extends from the remaining edges 11 of the first panel 10. On the second panel 20 one end of the first leg 51 extends vertically and perpendicular to the inner surface 23 from an edge 21. The second leg 52 extends inwardly from the second panel 20 from an opposite end of the first leg 51 and perpendicular to the first leg. As in the first panel, a similar latching device 50 extends from the remaining edges 21 of the second panel 20. The second legs 52 of the second panel latching devices 50 are arranged to interlockingly engage the corresponding second legs 42 of the first panel latching devices 40 when the second panel is folded over the first panel.

Sidewalls longitudinally oriented about the perimeter of the first panel 10, extend vertically and perpendicular to the first panels inner surface 13, having end portions 16 integrally connected to the corresponding hinging and latching members 30, 40 and of the same height as the members and an intermediate portion 17 between the end portions 16 arranged to form a recess to accept a predetermined amount of flat ribbon cables. Accordingly, sidewalls longitudinally oriented about the perimeter of the second panel 20, extend vertically and perpendicular to the second panels inner surface 23 having end portions 26 integrally connected to the corresponding hinging and latching members 30, 50 and an intermediate portion 27 between the end portions 26 arranged to form a recess to accept a predetermined amount of flat ribbon cables.

It should be noted that even though the description of the various parts of this invention have been described in a singular manner, they are all molded as a one-piece unitary structure.

Figure 3:
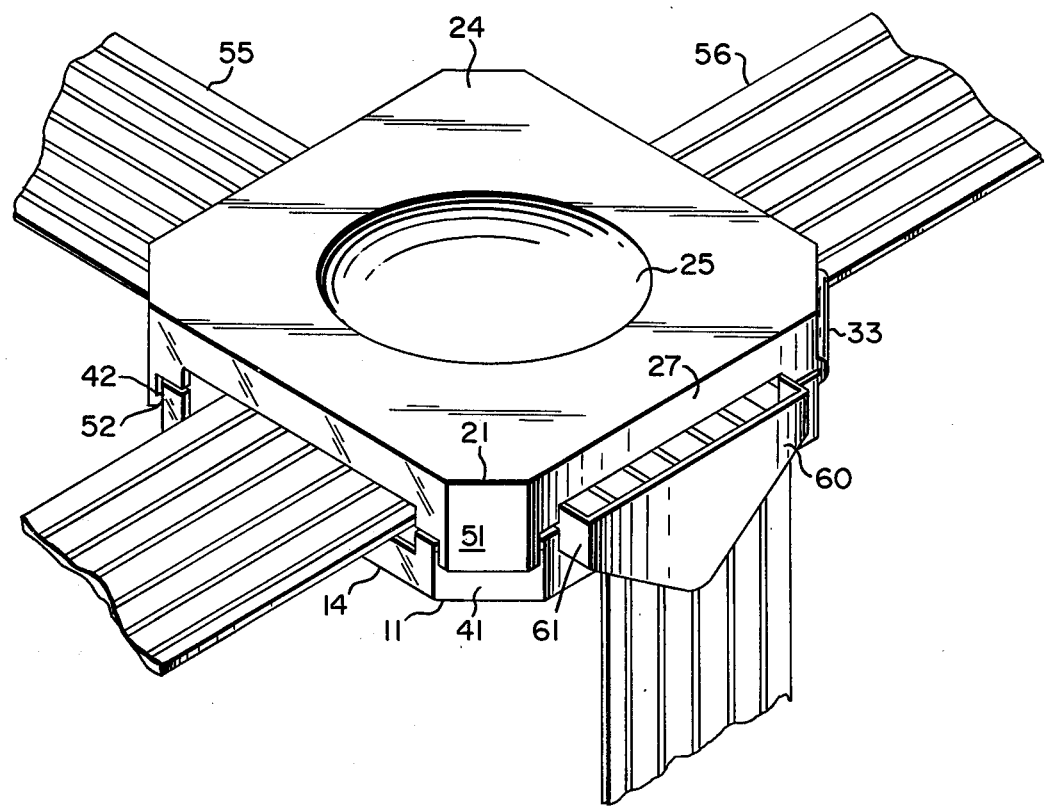
FIG. 3 is a perspective view of the flat ribbon cable retainer in accordance with the present invention, in its assembled or closed position.

Referring now to FIG. 1, the flat ribbon cable retainer is applied in the following manner. A flat ribbon cable 55 is entered transversely on an intermediate portion 17 on one first panel sidewalls folded on itself and exits on an intermediate portion 17 of a corresponding sidewall at an orthogonal direction. Similarly, a second flat ribbon cable 56 may be entered in the same manner described previously. The second panel 20 is then rotated about the hinge 30 to fold over the first panel 10 and folded cable 55, 56 and interlockingly engage corresponding second panel latching members 50 to first panel latching members 40 locking the panels together and retaining the folded cable in position, as shown in FIG. 3. The central portions 15 and 25 of inner surfaces 13, 23 apply a clamping force to the cable maintaining it in a tightly folded condition. It should be noted that any combination of straight or folded cable may be retained and routed by the invention and is limited only by the depth of the recess which is sized to hold a specified number of thicknesses of flat ribbon cable.

Some routings require that the cable break out at right angles to the plane it is lying in. To assist in this, a right angle breakout plate is used. The breakout plate as shown in FIG. 1 comprises a generally triangular member 60 and a pair of L-shaped arms formed at opposite ends. Each L-shaped arm is comprised of a first member 61 arranged to be positioned on the intermediate portion 17 of a sidewall with the second member 62 engaging inner surfaces of the sidewall end portion 16. When the retainer is locked together the breakout plate is retained in position within the recess formed by sidewall intermediate portions 17 and 27, as shown in FIG. 3. The breakout plate may be installed at any recess where the cable must be routed into or out of the retainer at 90° to the plane in which the retainer lies.

Outer surfaces 14, 24 of the first and second panels 10, 20 respectively, may be covered by an adhesive material as to facilitate mounting of the device to a supporting surface. Other appropriate arrangements of mounting the retainer to a supporting surface may be used and should not be limited to the method suggested above.

The present invention has been described with reference to a specific embodiment thereof, for the purpose of illustrating the manner in which the invention may be used to advantage, it will be appreciated by those skilled in the art that the invention is not limited thereto. Accordingly, any and all modifications, variations, or equivalent arrangements which may occur to those skilled in the art should be considered to be within the scope of the invention.

What is claimed is:

1. In combination a flat ribbon cable retainer carrying and angularly routing at least one of a plurality of flat ribbon cables, said retainer comprising:
   first and second planar panels, said first panel including a plurality of first edges of a first length arranged in equidistant and spaced relationship to one another along the perimeter on said first panel, and said second panel including a plurality of first edges of a second length arranged in an equidistant and spaced relationship to one another along the perimeter of said second panel;
   hinging means integrally joining said first panel to said second panel at one of said plurality of first panel first edges, and a corresponding one of said plurality of second panel first edges;
   first and second latching means, each mounted on a different one of said plurality of first panel first edges and third and fourth latching means each mounted on a different one of said plurality of second panel first edges and arranged in a mutual relationship with said first and second latching means;
   at least one flat ribbon cable positioned on said first panel between said hinging means and said first latching means, said cable folded upon itself and exiting said first panel between said hinging means and said second latching means, and alternatively, said cable folded upon itself and exiting said first panel between said first latching means and said second latching means, whereby said flat ribbon cable is retained in position when said second panel is rotated about said hinging means and positioned over said first panel, and said second panel third and fourth latching means interlockingly engaging said first and second latching means of said first panel.

2. In combination a flat ribbon cable retainer and cable as recited in claim 1, wherein: said first panel includes at least one additional latching means mounted on one of said plurality of first edges, and said second panel includes at least one additional latching means mounted on one of said plurality of first edges, said second panel additional latching means arranged to interlockingly engage said first panel additional latching means.

3. In combination a flat ribbon cable retainer and cable as recited in claim 1, wherein: said first and second panels each include an inner surface and an outer surface, said inner surface of said first and second panels each having a central portion generally convex in cross section.

4. In combination a flat ribbon cable retainer and cable as recited in claim 3, wherein: said hinging means comprising a U-shaped member having first and second legs, and flexuous portion perpendicular to said first and second legs integrally joining said legs at one end, the opposite end of said first leg integrally mounted vertically on the perimeter of one of said first panel first edges perpendicular to said inner surface and the opposite end of said second leg integrally mounted vertically on the perimeter of one of said second panel first edges perpendicular to said second panel inner surface.

5. In combination a flat ribbon cable retainer and cable as recited in claim 3, wherein: said latching means comprising first and second pairs of latching members, each member further including first and second legs, said first legs of said first pair of latching members each having one end integrally mounted vertically to the perimeter of a different one of said first panel first edges perpendicular to said first panel inner surface, and said second legs on an opposite end perpendicular to said first legs and oriented outward from said first panel, said first legs of said second pair of latching members each having one end integrally mounted vertically on the perimeter of a different one of said second panel first edges perpendicular to said second panel inner surface, and said second legs on an opposite end perpendicular to said first legs and oriented inward toward said second panel, said second legs of said first and second pairs of latching members arranged to interlockingly engage and latch said second panel to said first panel.

6. In combination a flat ribbon cable retainer and cable as recited in claim 5, wherein: there are included sidewalls longitudinally oriented about the perimeter and perpendicular to said first and second panels inner surface, further including end portions communicating with, and adjacent to said hinging and latching members, arranged to form a recess to transversely receive within said recess a flat ribbon cable.

7. In combination a flat ribbon cable retainer and cable as recited in claim 6, wherein: said sidewall end portions each include an inner surface; and there is further included a breakout plate comprising a generally planar member including L-shaped arms formed at opposite ends of said member, said L-shaped arms adapted to be inserted between said recess of said retainer and to engage said inner surfaces of said sidewall end portions, positioning said breakout plate perpendicular to said recess to allow for routing flat ribbon cables perpendicular to the plane in which said retainer lies.

8. In combination a flat ribbon cable retainer and cable as recited in claim 1, wherein: said first and second panels are composed of a resilient material.

9. In combination a flat ribbon cable retainer and cable as recited in claim 1, wherein: there is further included means for mounting said retainer to a supporting surface.

10. In combination a flat ribbon cable retainer and cable as recited in claim 3, wherein: said outer surfaces of said first and second panels are clad with an adhesive material to allow said retainer to be mounted to a flat surface.

* * * * *